United States Patent [19]
Chang

[11] Patent Number: 5,219,273
[45] Date of Patent: Jun. 15, 1993

[54] TORSIONAL DAMPER FOR AIR CONDITIONING COMPRESSOR

[75] Inventor: Roy Y. Chang, Wilmette, Ill.

[73] Assignee: General Motors Corporation, Detroit, Mich.

[21] Appl. No.: 889,877

[22] Filed: May 29, 1992

[51] Int. Cl.$^5$ .......................... F04B 9/02; F16D 3/76
[52] U.S. Cl. ..................................... 417/319; 464/89
[58] Field of Search .................. 417/269, 319; 464/91, 464/92, 89; 192/106.1, 84 C

[56] References Cited

U.S. PATENT DOCUMENTS

| | | | |
|---|---|---|---|
| 3,565,223 | 6/1969 | Pierce | 192/106.1 |
| 3,727,431 | 4/1973 | Yokel | 464/89 |
| 4,976,284 | 12/1990 | Hovarter | 417/269 |

FOREIGN PATENT DOCUMENTS 123028  9/1980  Japan .............................. 192/84 C Primary Examiner—Richard A. Bertsch
Assistant Examiner—Roland McAndrews
Attorney, Agent, or Firm—Ronald L. Phillips

[57] ABSTRACT

An air conditioning refrigerant compressor assembly includes a swash plate disposed on a drive shaft centrally within a housing. Three double-ended pistons are reciprocally supported on the swash plate within respective front and rear compression chambers. A pulley is freely rotatably supported concentrically about the drive shaft and connected by a flexible endless driving belt to a power take-off of an engine. A hub is fixedly retained on the end of a drive shaft. An annular torque cushion made of an elastomeric material is bonded to the hub and extends radially outwardly therefrom to support an outer ring concentrically about the drive shaft. An armature plate is fastened to the outer ring. An electromagnetic solenoid creates a field of magnetic flux when energized which draws the armature plate into frictional engagement with the pulley causing the rotary motion of the pulley to be transferred to the drive shaft which rotates the swash plate within the housing. The torque cushion has a tapering axial thickness decreasing steadily from a maximum thickness adjacent the hub to a minimum thickness adjacent the outer ring.

1 Claim, 7 Drawing Sheets

TORSIONAL DAMPER FOR AIR CONDITIONING COMPRESSOR

TECHNICAL FIELD

The subject invention relates to a compressor assembly including an electromagnetic clutch, and more particularly to an improved torque cushion extending between the drive shaft and the armature plate for improving stress distribution within the torque cushion upon clutch engagement and for reducing the first mode of resonant frequency of the compressor assembly to an RPM less than the idle RPM.

BACKGROUND ART

An inherent characteristic of an air conditioning compressor, such as used in an automotive air conditioning system, is the generation of vibration due to the dynamics of the compression process, the interaction of gaseous refrigerant flow between the cylinders and the compressors, and the physical characteristics of the moving parts. These vibrations have the undesirable effect of creating objectional noise and/or destructive forces when the compressor RPM causes vibration at the resonant frequency of the system, thereby causing the dangerous occurrence of resonance. Also, the vibrating components are prone to more rapid wear and premature failure.

It has been found that the specific design and construction of the torque cushion of the air conditioning compressor's electromagnetic clutch assembly contributes significantly to the frequency at which the compressor will resonate. The torque cushion is a resilient member disposed between the clutch armature and the drive shaft of the compressor. When the electromagnetic clutch is energized, a magnetic flux flowing through the armature plate pulls the armature plate against a rotating pulley to initiate rotation of the drive shaft. The moment at which the armature plate is engaged causes a significant instantaneous increase in the torsional stress of the drive shaft. Extreme and repeated increases in the torsional stress of the drive shaft contribute to premature failure.

To alleviate this problem, the prior art teaches the use of elastomeric, e.g., rubber, torque cushions which absorb torsional stresses upon engagement of the armature plate to the pulley and thereby protect the drive shaft from frequent loading at extremely high torsional stresses. Examples of the prior art elastomeric torque cushions are shown in the U.S. Pat. No. 3,384,213 to Bernard et al, issued May 21, 1968 and assigned to the assignee of the subject invention, and U.S. Pat. No. 4,624,354 to Koitabashi, issued Nov. 25, 1986.

Both of these prior art references disclose an annular elastomeric torque cushion having an axial thickness which is substantially constant throughout its entire radial extent. These elastomeric torque cushions have several deficiencies. Firstly, the shear stress exhibited in the elastomeric material of the torque cushion is significantly larger near the drive shaft. Hence, upon each engagement of the armature plate to the pulley, extremely high shear forces are placed upon the elastomeric material near the center of the torque cushion. Accordingly, failure of the torque cushion due to torsional stress will occur in those areas of highest shear stress. Secondly, the constant thickness elastomeric torque cushions do not have the axial resiliency needed when the armature plate is drawn against the pulley. During these times, the torque cushion acts as an axial spring by flexing in the axial direction to permit movement of the armature plate into engagement with the pulley. The stiffer, i.e., more resistant, the axial deflection of the torque cushion, the less friction is established between the armature plate and the pulley and hence the more likely slippage will occur. Thirdly, the prior art elastomeric torque cushions are known to significantly contribute to the establishment of a resonant frequency of the compressor. Of the prior art elastomeric torque cushions, resonance will occur within the normal operating speed, e.g., within the 3000 to 4000 RPM range, of the compressor, which, by way of reference, is usually about one and one half time greater than the RPM of the automotive engine. Hence, during normal operation, the prior art compressors will vibrate and shake at their resonant frequency causing undesirable noise and fatigue on the components thereof.

SUMMARY OF THE INVENTION AND ADVANTAGES

According to the subject invention, an air conditioning compressor assembly of the type for compressing a recirculated refrigerant fluid is provided. The assembly comprises a pump means for receiving low pressure fluid and discharging high pressure fluid, a drive shaft rotatably supported about a central axis and operatively connected to the pump means for actuating the pump, a rotor means supported for rotation about the central axis independently of the drive shaft for operative connection to the power take-off of an engine, an electromagnetic coupler means for selectively generating a field of magnetic flux passing through at least a portion of the rotor means, and an armature means disposed within the field of magnetic flux for frictionally engaging the rotor means in response to the magnetic flux. The improvement of the subject invention comprises an annular elastomeric torque cushion interconnecting the armature means and the drive shaft and having a maximum axial thickness adjacent the drive shaft and a minimum axial thickness adjacent the armature means with the axial thickness of the torque cushion decreasing from the maximum thickness to the minimum thickness to unify the stresses in the torque cushion and reduce the resonant frequency thereof.

The torque cushion of the subject invention has a tapering axial thickness which substantially overcomes the disadvantages of the constant thickness elastomeric torque cushions taught in the prior art. The tapering annular elastomeric torque cushion of the subject invention greatly assists in unifying, or equalizing, the shear stresses in the torque cushion and thereby creates a more reliable torque cushion when compared to the prior art. Secondly, the decreased thickness of the torque cushion adjacent its radially outward extremities yields a more axially resilient member so that when the electromagnetic coupler means, i.e., the clutch, is energized, the armature means is held with greater force against the rotor means. Accordingly, the possibility of slippage between the armature means and the rotor means is reduced. And finally, it has been found that by tapering the axial thickness of the torque cushion from the maximum thickness adjacent the drive shaft to a minimum thickness adjacent the armature means, the resonant frequency of the operating compressor assembly is substantially reduced to a point below the operating speed of the compressor assembly. Hence, the compressor assembly will not be induced to resonate during operation, and will thereby eliminate the possibility of objectional noise and component fatigue due to vibration.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
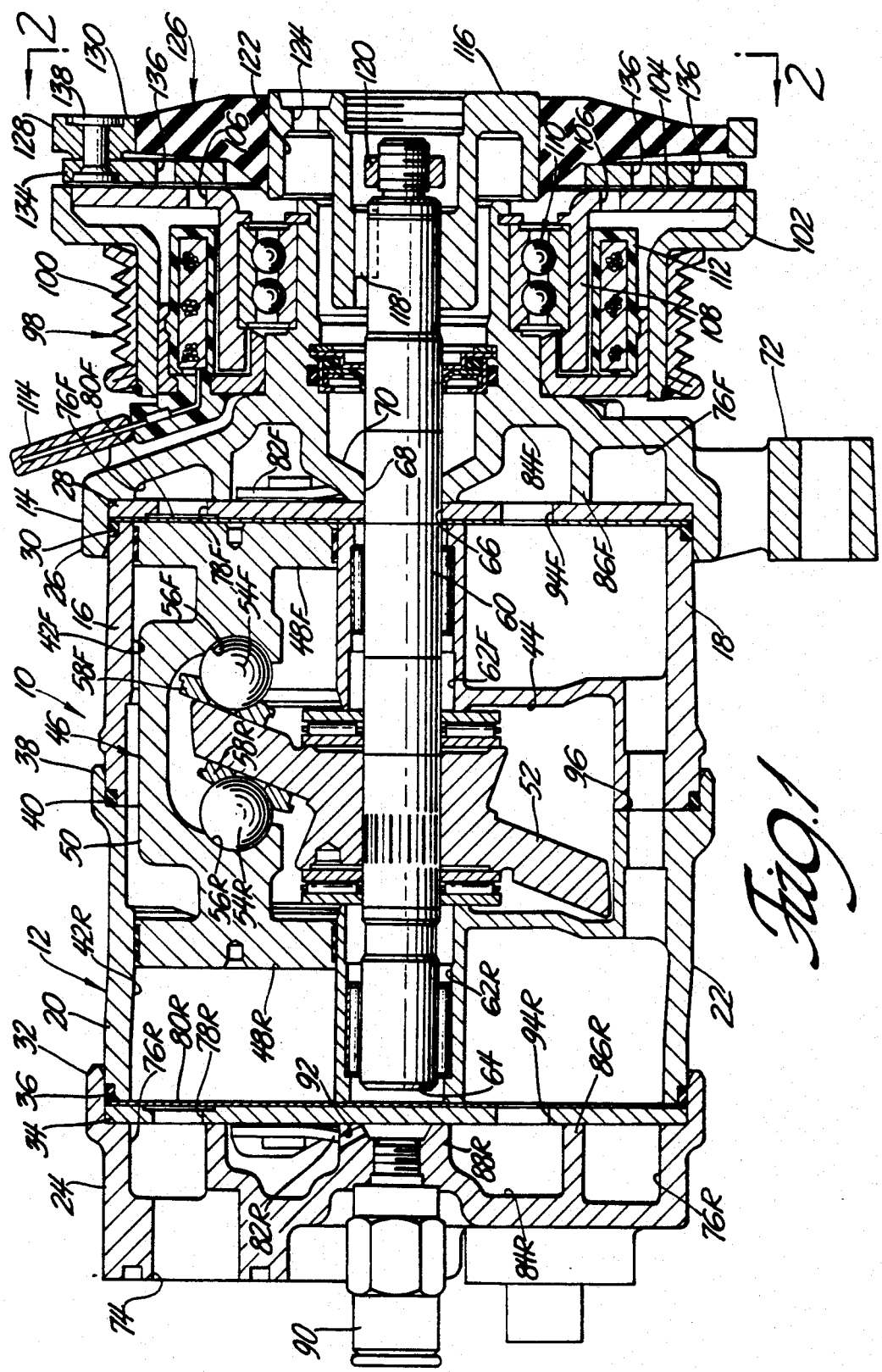
FIG. 1 is a cross-sectional view of a compressor assembly according to the subject invention.

Referring to the Figures, wherein like numerals indicate like or corresponding parts throughout the several views, an air conditioning compressor assembly according to the subject invention is generally shown at 10. The compressor assembly 10 is of the type for compressing a recirculated refrigerant fluid in an automotive air conditioning system having the normal condenser for condensing refrigerant gas into a liquid, orifice tube, evaporator, and accumulator arranged in that order between the compressor 10 discharge in suction sides.

The compressor assembly 10 includes a pump means, generally indicated at 12, for receiving low pressure fluid and discharging high pressure fluid. The pump means 12 is basically a fluid pump for circulating the refrigerant fluid. The pump means 12 includes a plurality of die-cast aluminum parts, including a front end formed by a front head 14, a front cylinder block 16 with an integral cylindrical shell or housing 18, a rear cylinder block 20 with an integral cylindrical shell or housing 22, and a rear end formed by a rear head 24. The front head 14 has a cylindrical collar 26 which telescopically fits over the front end of the front cylinder block housing 18 with a rigid, circular front valve plate 28 of steel sandwiched therebetween and an O-ring seal 30 provided at their common juncture.

Similarly, the rear head 24 includes a cylindrical collar 32 disposed telescopically over the rear end of the rear cylinder block housing 22 with a rigid, circular rear valve plate 34 of steel sandwiched therebetween and an O-ring seal 36 providing sealing at their common juncture. At the juncture of the front 16 and rear 20 cylinder blocks, the rear cylinder block housing 22 includes a cylindrical collar 38 at its forward end which telescopicly fits over the rearward end of the cylinder block housing 18, and there is provided an O-ring seal 40 to seal its joint in the transversely split two-piece cylinder block thus formed.

The front and rear cylinder blocks 16, 20 each have a cluster of three equally angularly and radially spaced and parallel thin-walled cylinders forming compression chambers 42F and 42R, respectively, with the suffixes F and R being used herein to note front and rear counterparts in the compressor assembly 10. It being noted, however, that only one of the three cylinders is illustrated in FIG. 1. The compression chambers 42F, 42R in each cluster are integrally joined along their length with each other at the center of their respective cylinder blocks 16, 20 and at their respective cylinder block housings 18, 22. The compression chambers 42F in the front cylinder block 16 are axially aligned with the compression chamber 42R in the rear cylinder block 20. The outboard end of each compression chamber 42F, 42R is closed by their respective front and rear valve plates 28, 34. The oppositely facing inboard ends of the aligned compression chambers 42F, 42R are axially spaced from each other and, together with the remaining inboard end details of the cylinder blocks 16, 20 and the interior of their respective integral housings 18, 22, respectively, form a central crank case cavity 44 in the pump means 12.

A symmetrical double-ended piston, generally indicated at 46 in FIG. 1, is fabricated of aluminum and is reciprocally mounted on each pair of axially aligned compression chambers 42F, 42R with each piston 46 having a short, cylindrical front head 48F and a short cylindrical rear head 48R of equal diameter which slide in their respective front 42F and rear 44R compression chambers. The two heads 48F, 48R of each piston 46 are joined by a bridge 50 spanning the crank case cavity 44. The pistons 46 cyclicly intake and discharge refrigerant fluid from the respective compression chambers 42F, 42R in the manner of a two-cycle pump and, upon discharge, create a cyclic discharge pressure pulsation of fluid and a corresponding pulse throughout the structure of the entire compressor assembly 10. Because the pump means 12 includes six piston heads 8F, 48R, six such pulses are created per revolution and therefore the resonance of the entire compressor assembly 10 will be greatest along the six, twelve, eighteen, etc. orders of excitation.

The three pistons 46 are driven in a conventional manner by a swash plate 52 which moves the pistons 46 from each side through a pair of balls 54F, 54R which fit in respective sockets 56F, 56R and slippers 58F, 58R which slideably engage the respective sides of the swash plate 52. The swash plate 52 is fixed to and driven by a drive shaft 60 rotatably supported about a central axis on opposite sides of the swash plate 52 in the two-piece cylinder block 16, 20 by a bearing arrangement, thus defining a central axis about which the drive shaft 60 rotates. In a conventional manner, the drive shaft 60 is operatively connected to the pump means 12 for actuating the pump means 12. More particularly, the front cylinder block 16 and the rear cylinder block 20 include a shaft bore 62F, 62R, respectively, disposed centrally therethrough. A rear end 64 of the drive shaft 60 terminates within the rear cylinder block shaft bore 62R adjacent the rear valve plate 28. The opposite end of the drive shaft 60 extends through the front cylinder block shaft bore 62F through a central hole 66 in a front valve plate 28 and thence outwardly through an aligned hole 68 in a tubular extension 70 which projects outwardly from and is integral with the front head 14.

For mounting the compressor assembly 10, three mounting arms 72, only one of which is shown in FIG. 1, are integrally formed with the front head 14 at the three o'clock, six o'clock, and nine o'clock positions.

Describing now the refrigerant flow system within the compressor assembly 10, gaseous refrigerant with some oil entrained therein enters through an inlet 74 in the rear head 24 and into a small annular rear suction cavity 76R in the rear head 24 as shown in FIG. 1. The entering refrigerant is directed through the rear suction cavity 76R to one of three apertures 78R in the rear valve plate 34, each aperture 78R being closed by a reed valve 80R. Additionally, refrigerant in the rear suction cavity 76R is directed to a transfer passage (not shown) extending between adjacent cylinders for conveying low pressure refrigerant to a front suction cavity 76F. An oil separation passage (not shown) is disposed in the transfer passage between the rear 76R and front 76F suction cavities for inducing oil separation from the passing refrigerant for lubricating the pistons 46 and the surrounding moving components. Three apertures 78F in the front suction cavity 76F open to the respective compression chambers 42F through corresponding reed valves 80F.

For the discharge of refrigerant upon compression thereof in the compression chambers 42F, 42R, there are formed separate discharge ports (not shown) in the respective valve plates 28, 34. Opening and closing of their respective discharge ports is effected in the usual manner by separate reed-type discharge valves of spring steel which are backed up by rigid retainers 82F, 82R. The discharge ports are opened by their respective discharge valves to a generally annular discharge chamber 84F, 84R in the respective front and rear heads 14, 24. For a more detailed explanation of the movement of suction and discharge fluids within the compressor 10, reference is made to U.S. Pat. No. 3,057,545 to Ransom et al, issued Oct. 9, 1962 and assigned to the assignee of the subject invention, the disclosure of which is herein incorporated by reference.

The rear discharge chamber 84R is formed by the inboard side of the rear head 24, an interior cylindrical wall 86R extending from the rear head 24, a central inboard projecting extension 88R extending from the inboard side of the rear head 24, and by the outboard side of the rear valve plate 34. A typical high pressure relief valve 90 is threaded in the rear head 24 centrally within the inboard projecting extension 88R and communicates with the rear discharge chamber 84R via a skewed radial bore 92.

A front discharge chamber 84F is formed in substantially the same manner as that described above wherein an annular wall 86F forms an exterior barrier and a central extension 88F forms an interior extension and bounded by the outboard side of the front valve plate 28. High pressure discharge refrigerant directed into the front discharge chamber 84F is directed through an opening 94F in the front valve plate 28 and then into a discharge refrigerant passage 96 formed between adjacent compression chambers and isolated from the crank case cavity 44. A corresponding opening 94R in the rear valve plate 34 transmits discharge refrigerant from the transfer passage 96 to the rear discharge chamber 84R. A discharge outlet (not shown) communicates through the rear head 24 to the rear discharge chamber 84R for transmitting high pressure refrigerant fluid to the remaining cooling circuit.

A rotor means, generally indicated at 98 in FIG. 1, is supported for rotation about the central axis independently of the drive shaft 60 for operative connection to the power take off of an engine. The rotor means 98 is disposed adjacent the forward end of the pump means 12 and in typical fashion includes an annular pulley 100 adapted to frictionally and operatively engage an endless driving belt driven by the power take-off from an automotive engine. The pulley 100 is connected by an L-shaped flange 102 to an annular clutch surface 104 disposed in a plane perpendicular to the central axis. The clutch surface 104 includes a plurality of arcuate slots 106 disposed therein in typical fashion. Extending perpendicularly rearwardly from the clutch surface 104, and spaced radially inwardly from the pulley 100, is provided a support ring 108. The support ring 108 and pulley 100 are spaced radially from one another to form an annular pocket therebetween. The support ring 108 is forcibly retained on, or otherwise secured to, a ball bearing assembly, generally indicated at 110. The ball bearing assembly 110, in turn, is forcibly retained on, or otherwise secured to, the exterior of the extension 70 extending forwardly from the front head 14. In this manner, the rotor means 98, and more importantly the pulley 100, is supported for independent rotation, i.e., independent of the drive shaft 60, about the central axis.

An electromagnetic coupler means 112 is disposed adjacent the rotor means 98 for selectively generating a field of magnetic flux passing through at least a portion of the rotor mean 98. The electromagnetic coupler means 112, more particularly, is a solenoid, also known as a field assembly, which is fixedly supported on the front head 24 and stationarily disposed within the annular pocket formed between the rotating pulley 100 and the rotating support ring 108. The magnetic flux generated by the electromagnetic coupler means 112 flows in a circulating path with a portion of the magnetic flux flowing through the clutch surface 104 An electrical terminal 114 extends from the electromagnetic coupler means 112 to supply the necessary electrical current to create the field of magnetic flux.

Figure 2:
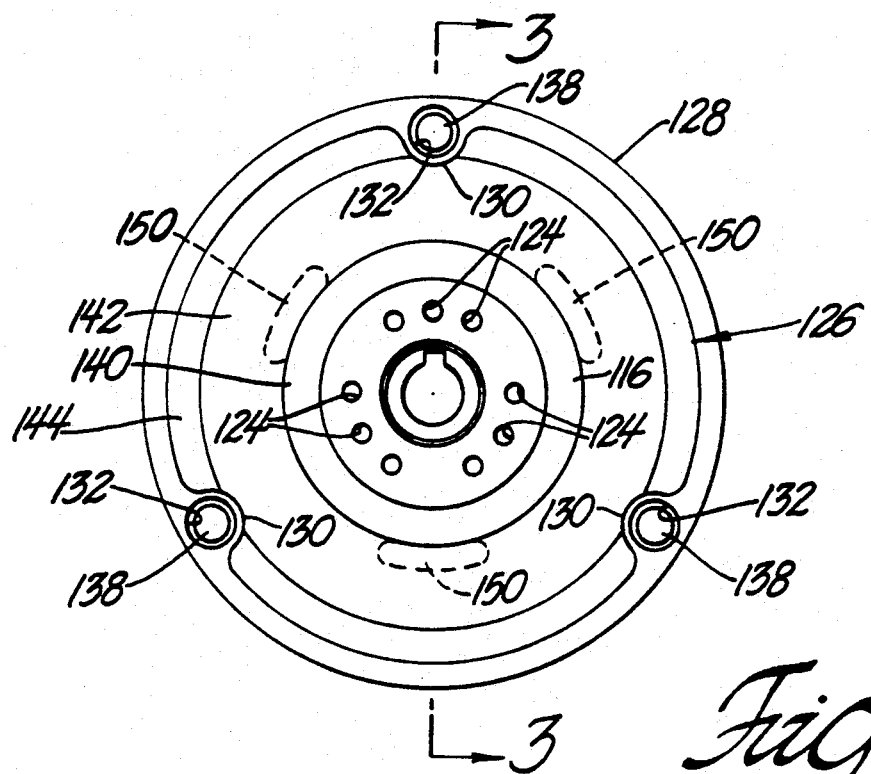
FIG. 2 is a front view of the hub, torque cushion, and outer ring as taken substantially along lines 2—2 of FIG. 1.

A generally circular hub 116 is fixedly secured to the forward end of the drive shaft 60 and disposed concentrically thereabout by means of a key 118 disposed in corresponding and aligned keyways of the drive shaft 60 and hub 116, and also secured by a nut 120 threadably disposed on the forward distal end of the drive shaft 60. The hub 116 is shown in detail in FIGS. 2-4 including an annular groove 122 disposed on the rearward side thereof. Nine holes 124 extend axially through the hub 116 and intersect the annular groove 122. The holes 124 are arranged in groups of three spaced 120° on center from one another, as shown in FIGS. 2 and 5. Preferably, the hub 116 is formed from powdered metal using conventional sintering techniques.

An annular elastomeric torque cushion, generally indicated at 126, extends radially outwardly from the hub 116. The disc-like torque cushion 126 is preferably manufactured from a rubber compound, such as neoprene or Vamac. The torque cushion 126 is bonded to the hub 116 using conventional rubber-to-metal bonding techniques.

Disposed about the periphery of the torque cushion 126 is a generally annular outer ring 128 which is disposed concentrically about the central axis. Like the hub 116, the outer ring 128 is fabricated from powdered metal using a conventional sintering technique. The outer ring 128 includes three equally spaced enlargements 130 having axially extending passages 132 disposed through each. The outer ring 128 is securely bonded to the periphery of the torque cushion 126 in a conventional manner as the hub 116.

An armature means comprising an armature plate 134 is disposed within the field of magnetic flux created by the electromagnetic coupler means 112 for frictionally engaging the rotor means 98, and more particularly the clutch surface 104, in response to a flow of magnetic flux created by the electromagnetic coupler means 112. The armature plate 134 is shown in FIG. 1 comprising an annular plate disposed in a plane perpendicular to the central axis and presented in face-to-face relation with the clutch surface 104 of the rotor means 98. The armature plate 134 is provided with a plurality of arcuate slots 136 strategicly positioned relative to the arcuate slots 106 in the clutch surface 104 to force the magnetic flux path between the armature plate 134 and the clutch surface 104, around the respective arcuate slots 136, 106, to draw the armature plate 134 into frictional engagement with the clutch surface 104.

The armature plate 134 is fixedly secured to the outer ring 128 by way of rivets 138 disposed through the passages 132 in the enlargements 130 of the outer ring 138. Therefore, the armature plate 134 and the outer ring 128 are fixedly and rigidly secured to one another. Hence, during axial movement of the armature plate 134 toward the clutch surface 104 due to the magnetic flux, the torque cushion 126 flexes axially in a resilient, spring-like manner. And, upon discontinuance of the magnetic flux, the spring-like torque cushion 126 returns the armature plate 134 to an axial spacing from the clutch surface 104 somewhere between 0.015 inches and 0.040 inches. It should be noted that the relatively simple and quick attachment of the armature plate 134 to the outer ring 128/torque cushion 126/hub 116 assembly greatly improves the complicated assembly process required by the prior art attachments.

Figure 3:
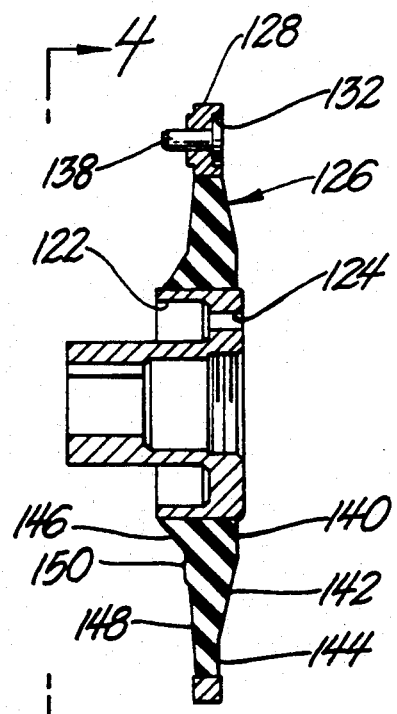
FIG. 3 is a cross-sectional view as taken substantially along lines 3—3 of FIG. 2.

The elastomeric torque cushion 126 has a maximum axial thickness adjacent the hub 116 and a minimum axial thickness adjacent the outer ring 128, with the axial thickness of the torque cushion 126 decreasing steadily from the maximum thickness to the minimum thickness to unify the stresses in the torque cushion 126 and reduce the resonant frequency of the torque cushion 126. More specifically, and referring to FIG. 3, the torque cushion 126 includes an inner forward surface 140 adjacent the hub 116 and disposed in a plane generally perpendicular to the central axis. An intermediate forward surface 142 extends frustoconically and radially from the inner forward surface 140. Measured along an acute angle from the central axis, the intermediate forward surface is inclined at an angle between 75° and 80°, and more particularly at about 77°. An outer forward surface 144 of the torque cushion 126 is adjacent the outer ring 128 and extends in a plane generally perpendicular to the central axis. The enlargements 130 of the outer ring 138 extend inwardly into an interrupt the outer forward surface 144 as shown in FIG. 3. An inner rearward surface 146 is disposed adjacent the hub 116 and has an inverted frustoconical shape inclined at a predetermined acute first angle of 50° measured relative to the central axis. An outer rearward surface 148 is disposed adjacent the outer ring 128 and has an inverted frustoconical shape inclined at a predetermined acute second angle of 85°, which is greater than the first angle of 50°. Hence, the axial thickness of the torque cushion 126, as represented in cross section in FIG. 3, has a gradually tapering character extending from its maximum thickness adjacent the hub 116 to its minimum thickness adjacent the outer ring 128.

Figure 4:
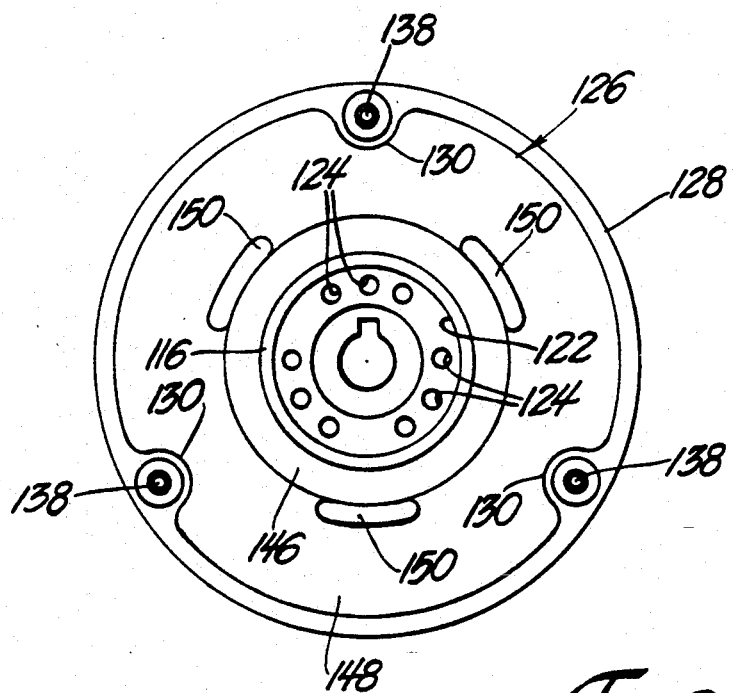
FIG. 4 is a rear view of the hub, the torque cushion, and the outer ring of the subject invention as taken substantially along lines 4—4 of FIG. 3.
Figure 5:
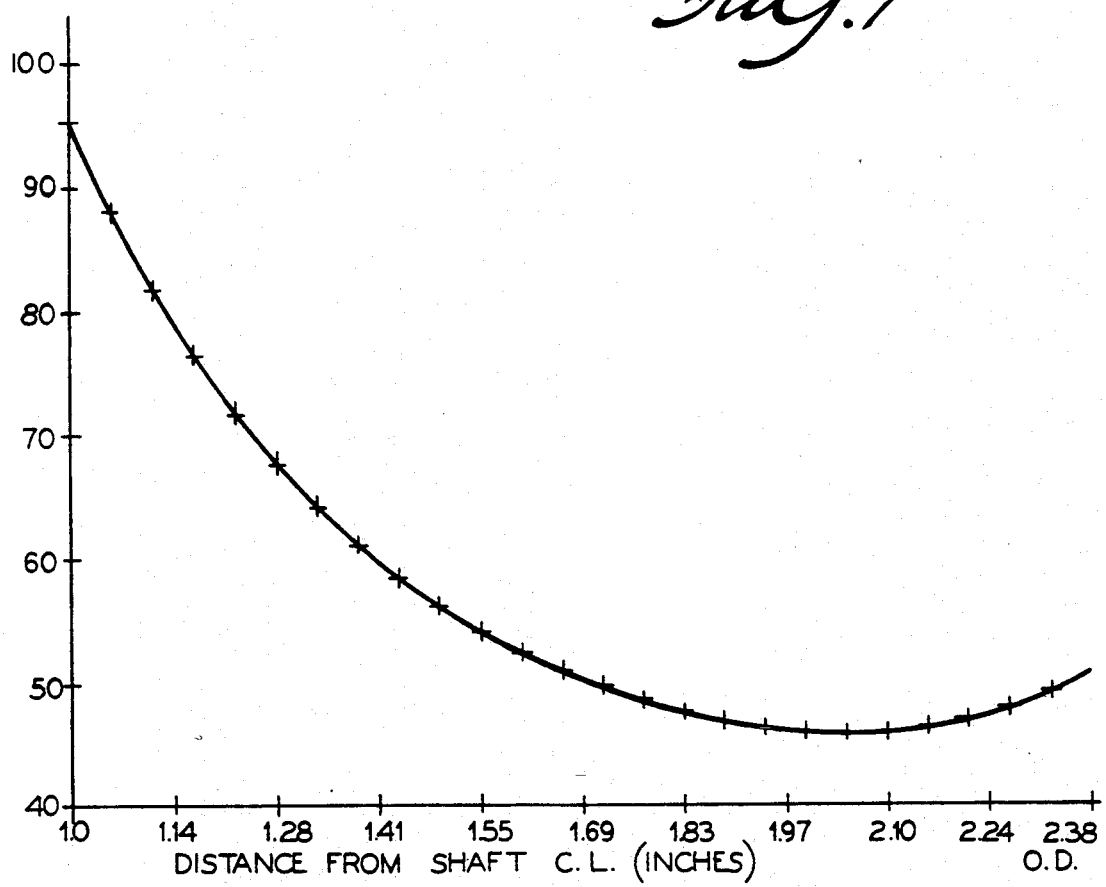
FIG. 5 is a graph illustrating the shear stress in the annular torque cushion at varying distances from the center line of the drive shaft taken at a 30 ft.-lb. load.

As best shown in FIGS. 1, 3, and 4, the torque cushion 126 includes three equally spaced and concentrically positioned pads 150 disposed on and extending axially rearwardly from the outer rearward surface 148. The pads 150 engage the forward surface of the armature plate 134 to maintain an optimal maximum spacing between the armature plate 134 and the clutch surface 104.

It has been determined through testing that the unique tapering structure of the torque cushion 126 provides the subject compressor assembly 10 with unique and highly advantageous performance results. Specifically, and referring now to FIG. 5, it is found that by tapering the axial thickness of the torque cushion 126, the shear stresses occurring within the torque cushion 126 at various radial distances from the central axis can be more closely unified, when compared to those shear stresses occurring in the elastomeric torque cushions found in the prior art.

In FIG. 5, the shear stress in the torque cushion 126 occurring at various radial distances from the central axis, i.e., the center line of the drive shaft 60, is shown. FIG. 5 illustrates that the highest shear stress occurs directly adjacent the interface between the torque cushion 126 and the hub 116. This stress is found to be approximately 95 pounds per square inch. Although the shear stress decreases away from the center line of the drive shaft 60 to a minimum of 46 pounds per square inch at approximately 2.04 inches, the rate and quantity of decrease in stress is significantly less than that occurring in prior art designs under equal load conditions. The values of shear stress in FIG. 5 were generated by applying a torque load of 30 ft.-lbs. to the torque cushion 126.

Figure 6:
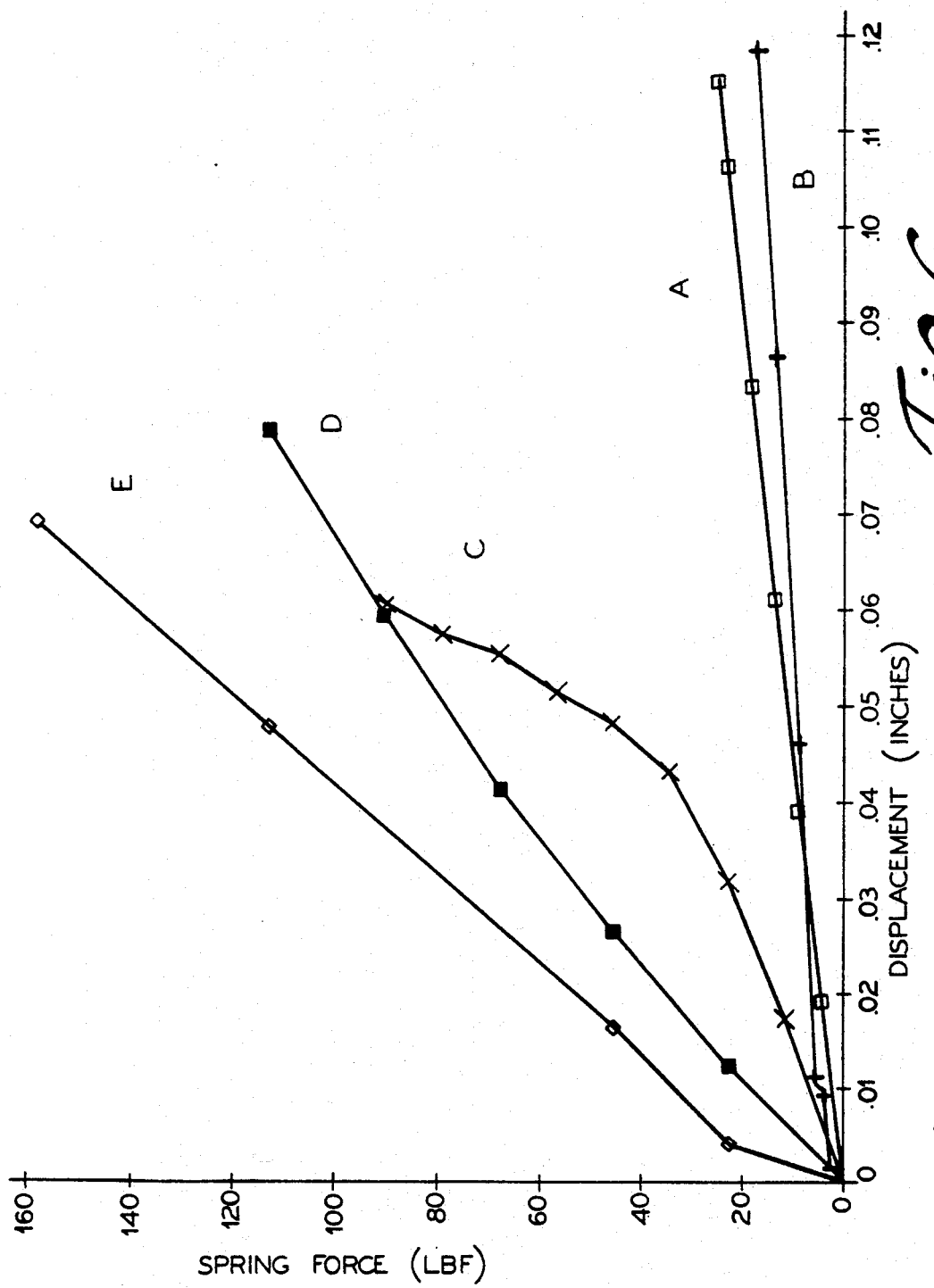
FIG. 6 is a graph comparing the axial stiffness of the subject torque cushion to four prior art torque cushions.

FIG. 6 illustrates the highly resilient nature of the subject torque cushion 126 by measuring axial stiffness of the subject torque cushion 126 and comparing the measurements to four prior art torque cushions. In FIG. 6, the subject tapered annular torque cushion 126 is shown in curve A and represented by the undarkened squares occurring at various data points. The current production torque cushion used by the assignee of this invention on the Harrison Radiator HR6 compressor is shown in curve B and represented by "+" signs occurring at various data points. The Lord annular torque cushion is shown in curve C and represented by "x" signs occurring at various data points. the Nippondenso torque cushion is shown in curve D and represented by darkened squares occurring at various data points. And, the Ogura "0" spring torque cushion is shown in curve E and represented by undarkened diamonds occurring at various data points. As mentioned above, the normal air space distance between the armature plate 134 and the clutch surface 104 is between 0.015 inches and 0.040 inches. Within this range, the subject torque cushion 126 exhibits the lowest axial stiffness of the various torque cushions tested, as shown in FIG. 6. Accordingly, very little separation forces from torque cushion 126 to the armature plate 134 tending to separate the armature plate 134 and the clutch surface 104 are encountered during activation of the electromagnetic coupler means 112.

Figure 7:
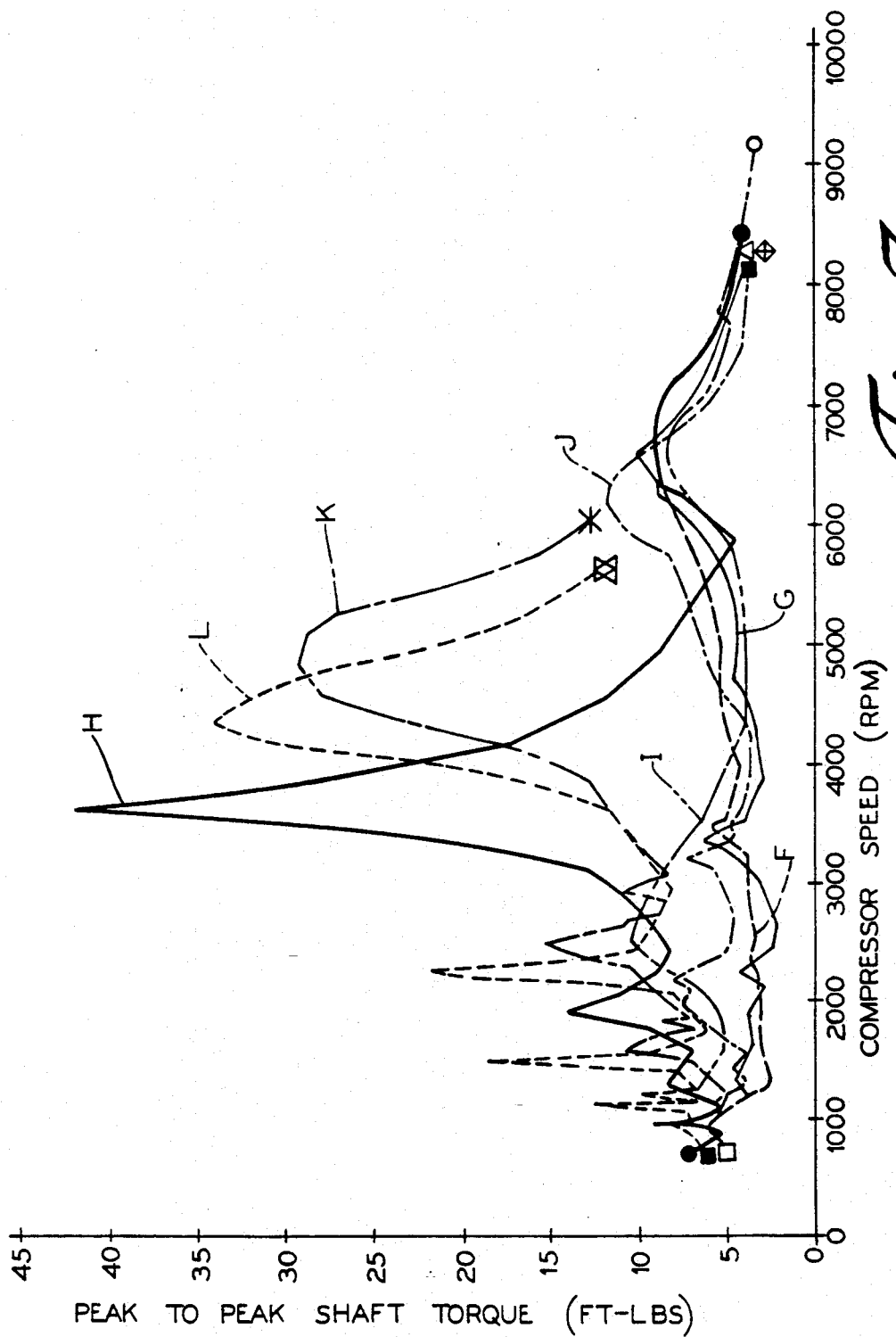
FIG. 7 is a graph illustrating the peak-to-peak drive shaft torque transmitted from the pulley to the drive shaft through the subject torque cushion manufactured from two different elastomeric compounds and compared to five prior art torque cushions at various compressor speeds.
Figure 8:
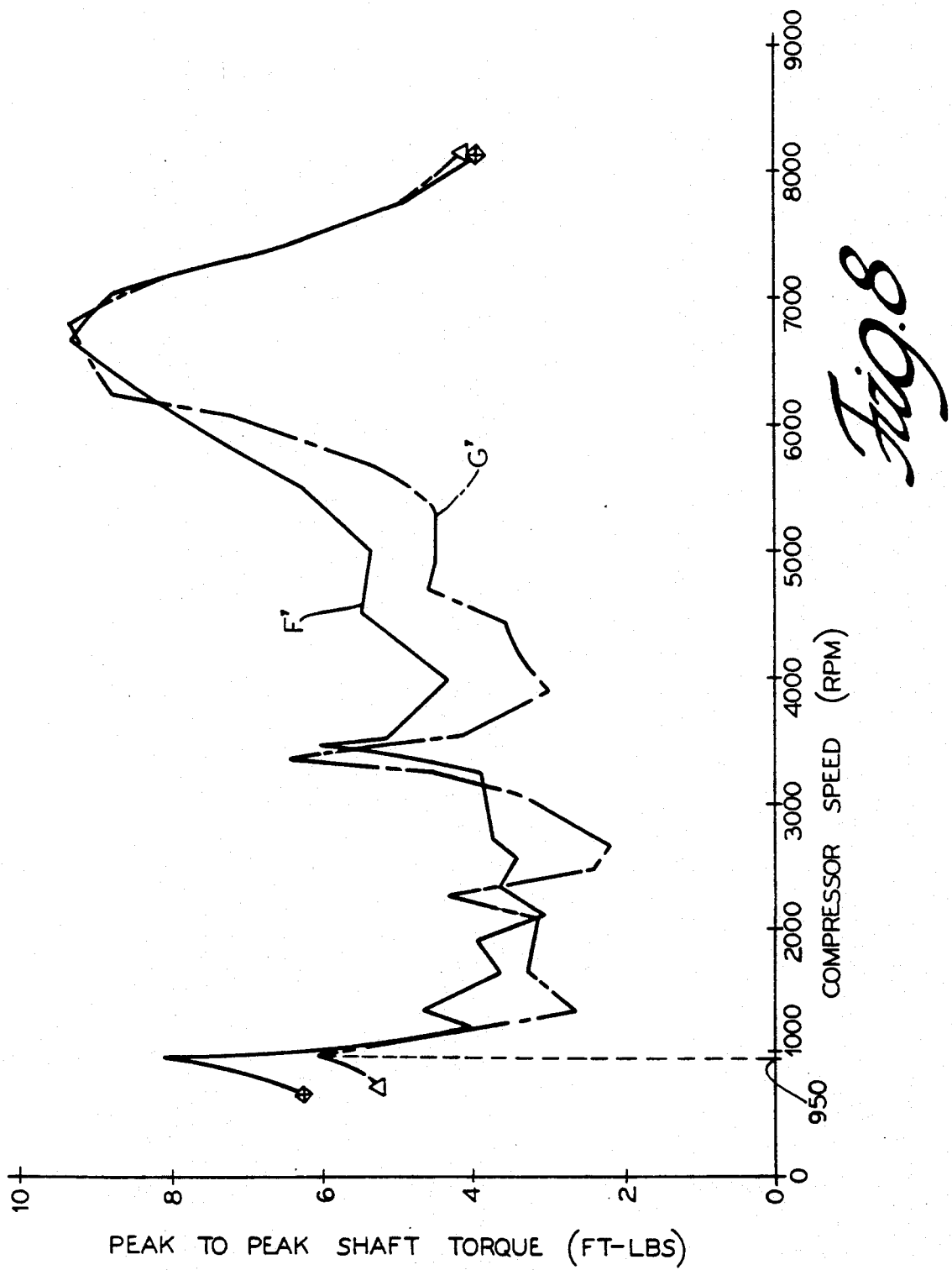
FIG. 8 is an enlarged view of FIG. 7 comparing only the two alternative elastomeric compounds of the subject annular torque cushion.

FIGS. 7 and 8 illustrate the peak-to-peak torque produced in the drive shaft 60 upon engagement of the armature plate 134 and the rotor means 98 when two different elastomeric compounds, neoprene and Vamac, are used for the torque cushion 126 and, in the case of FIG. 7, comparing the subject torque cushion 126 with various prior art torque cushions. It will be appreciated that the less shaft torque transferred to the drive shaft 60, the less prone the drive shaft 60 and related components will be susceptible to premature failure. From FIG. 7, it is shown that the subject torque cushion 126 has the lowest torsional stiffness overall, and exhibits the best results over the entire speed range tested. Specifically, the subject torque cushion 126 as fabricated from a neoprene compound is shown in curve F and represented by a diamond and superimposed "+" sign at the last data point. The subject torque cushion 26 as fabricated from a Vamac compound is shown in curve G and represented by a triangle at the last data point. The current production torque cushion of the assignee of the subject invention is shown in curve H and represented by a darkened circle at the first and last data points. The Nippondenso torque cushion is shown in curve I and represented by an undarkened circle at the last data point. The Lord annular torque cushion is shown in curve J and represented by a darkened square at the first and last data points. The Warner 60-D torque cushion is shown in curve K and represented by a star at the last data point. And, the Magna #1 torque cushion is shown in curve L and represented by the superimposed and inverted triangles at the last data point. All of the curves in FIG. 7 were generated from tests conducted on a Harrison Radiator HR6 compressor at 300 psig head pressure, except for the Warner (curve K) and Magna (curve L) torque cushions which were tested at 200 psig head pressure.

To better illustrate the extremely low torsional stiffness of the subject torque cushion 126 when fabricated from either neoprene or Vamac, the test results of FIG. 7 have been enlarged in FIG. 8 isolating and showing only the subject torque cushion 126 fabricated from both neoprene (curve F') and Vamac (curve G'). It will be noted that the Vamac compound has slightly greater damping than the neoprene (curve F'). At the first mode, 95 Hz (approximately 950 rpm), the Vamac is 2 fts.-lbs. peak-to-peak lower than neoprene. At the second mode, 680 Hz (approximately 3375 rpm), both neoprene and Vamac have the same peak-to-peak magnitude.

Figure 9:
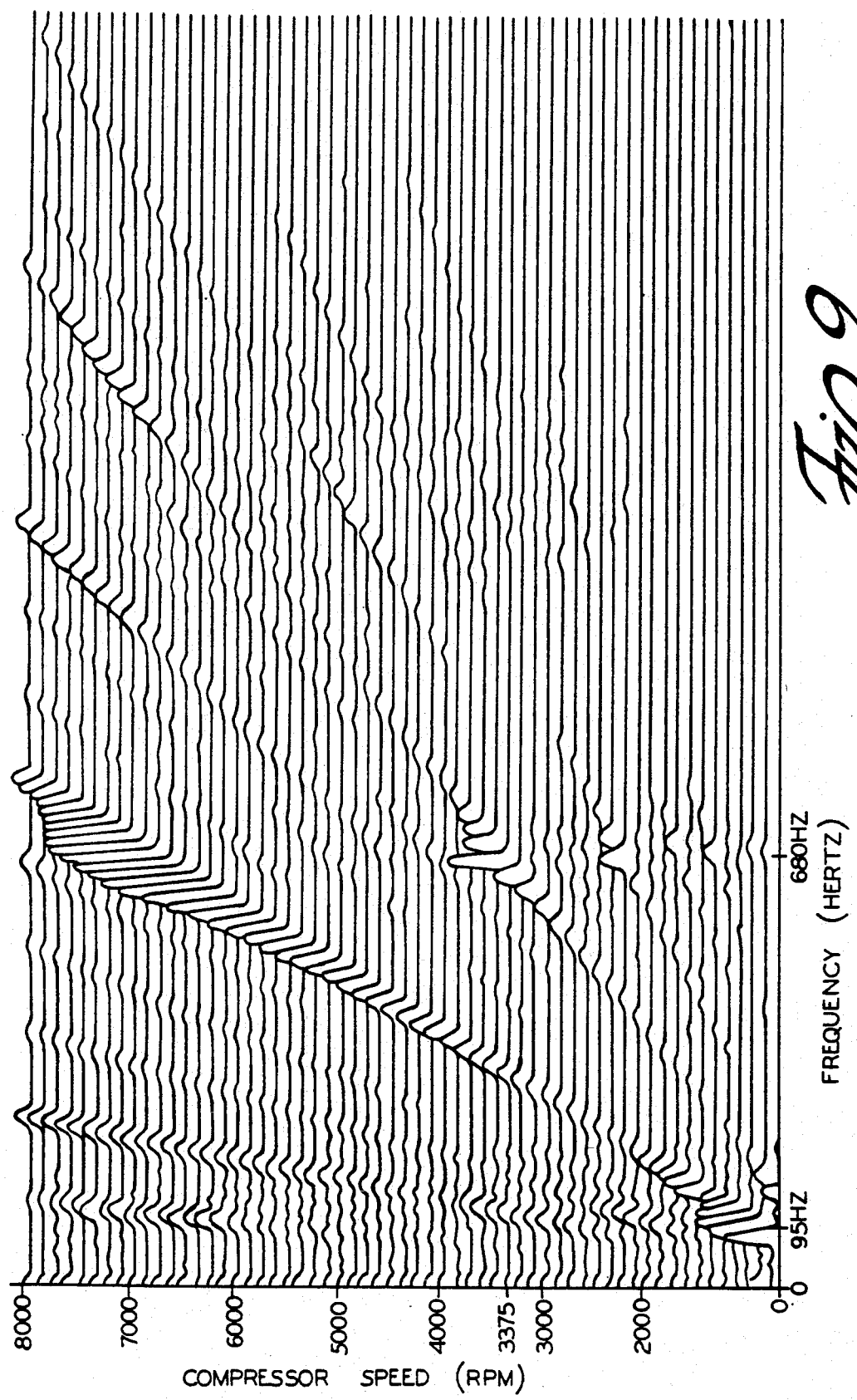
FIG. 9 is a waterfall plot illustrating the resonant frequencies generated on a six cylinder swash plate compressor using the subject annular torque cushion at various operating speeds.

FIG. 9 is a waterfall plot generated from a Fast Fourier Transform test apparatus and illustrating the various frequency vibrations from the compressor assembly 10. Of particular interest in FIG. 9 is the specific RPM at which resonance occurs. FIG. 9 was generated using a tapered annular torque cushion 126 according to the subject invention fabricated from a Vamac compound. Although it can be seen in FIG. 9 that the first mode (95 Hz) can be excited by the first, second, and third orders of excitation, their magnitudes are small compared with the sixth order excitation at the same frequency. This sixth order of excitation produces the spike in peak-to-peak shaft torque at 950 RPM, as shown in FIG. 8. The peaks at 3300 RPM and at 2200 rpm, shown best in FIG. 8, are caused by the 12th order and the 18th order excitation of the second mode (680 Hz), respectively. This phenomena is clearly seen on the waterfall plot of FIG. 9.

As described above, the torsional stiffness of the torque cushion (illustrated graphically in FIG. 8) is directly related to the resonance RPM of the compressor assembly 10 (as shown in FIG. 9). More particularly, it has been found through testing that as the torsional stiffness of the torque cushion 126 is decreased, the first mode of resonance will be shifted to a lower frequency. However, the second mode of resonance stays roughly the same. Hence, the first mode of resonance of the subject tapered annular torque cushion 126 occurs at 950 RPM, which is below the idle speed of all automotive applications for the subject compressor assembly 10. Hence, during normal operation, the compressor assembly 10 will never resonate at its first mode (95 Hz). And, because the second mode (680 Hz) of resonance is only mildly excited by the 12th order and 18th order of excitation, i.e., 3375 RPM and 2200 RPM, respectively, the compressor assembly 10 will not exhibit objectionable vibration throughout the full range of normal operating speeds. It being noted that the sixth order excitation of the second mode will cause resonance, but the compressor 10 speed must exceed 6000 RPM to cause such resonance, which speed is much higher than the compressor 10 will be operated at on a passenger vehicle.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. An air conditioning compressor assembly of the type for compressing a recirculated refrigerant fluid, said assembly comprising: a fluid pump having a forward end and a rearward end; a drive shaft rotatably supported about a central axis and operatively connected to said fluid pump; a generally circular hub fixedly secured to said drive shaft adjacent said forward end; a pulley adjacent said forward end of said fluid pump and supported for rotation about said central axis independently of said drive shaft and including a clutch surface; a solenoid adjacent said forward end of said fluid pump for selectively generating a field of magnetic flux passing through at least a portion of said clutch surface of said pulley; an armature plate disposed in facing relation to said clutch surface and within said field of magnetic flux for frictionally engaging said clutch surface; a generally annular outer ring disposed concentrically about said central axis and fixedly secured to said armature plate; an annular elastomeric torque cushion extending radially between and bonded to each of said outer ring and said hub; said torque cushion including an inner forward surface adjacent said hub and disposed in a plane generally perpendicular to said central axis, an intermediate forward surface extending frustoconically and radially from said inner forward surface, an outer forward surface adjacent said outer ring and extending in a plane generally perpendicular to said central axis, an inner rearward surface adjacent said hub and having an inverted frustoconical shape inclined at a predetermined acute first angle measured relative to said central axis, and an outer rearward surface adjacent said outer ring having an inverted frustoconical shape inclined at a predetermined acute second angle greater than said first angle.

* * * * *